Aug. 17, 1965 C. E. ACKLEY 3,200,556
CAPSULE SEALING METHOD AND APPARATUS
Filed Oct. 12, 1962 2 Sheets-Sheet 1
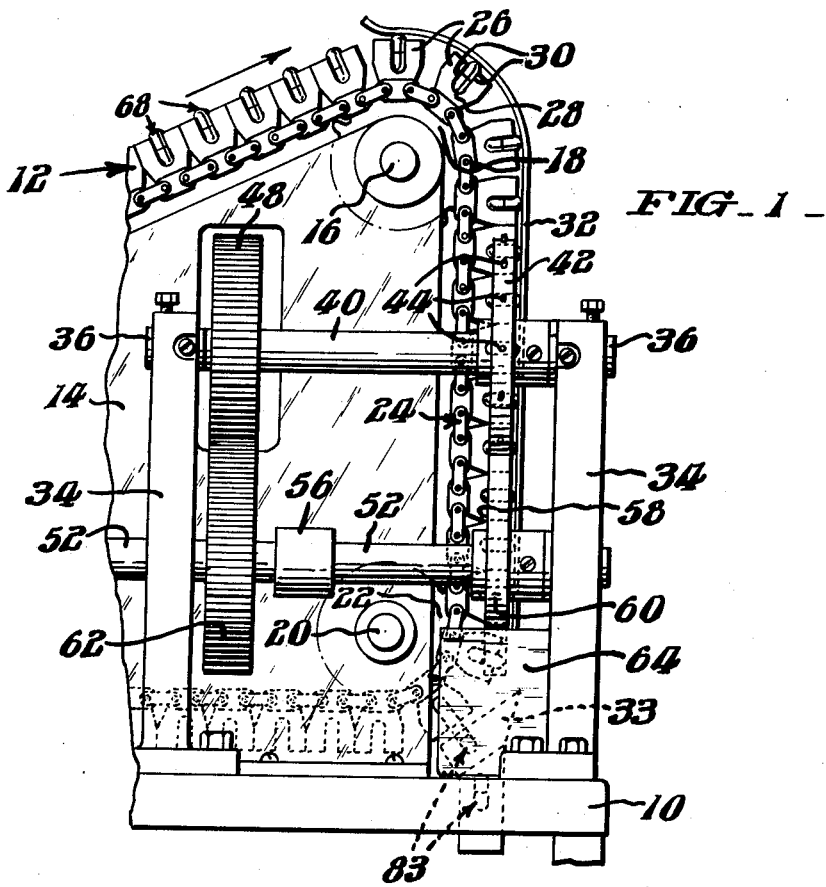
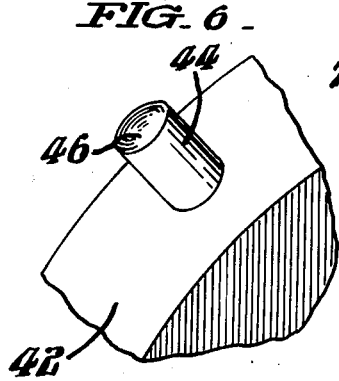
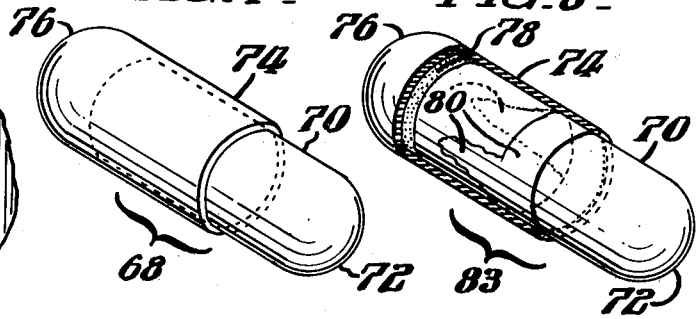
INVENTOR.
Charles E. Ackley,
BY
Paul & Paul
ATTORNEYS.

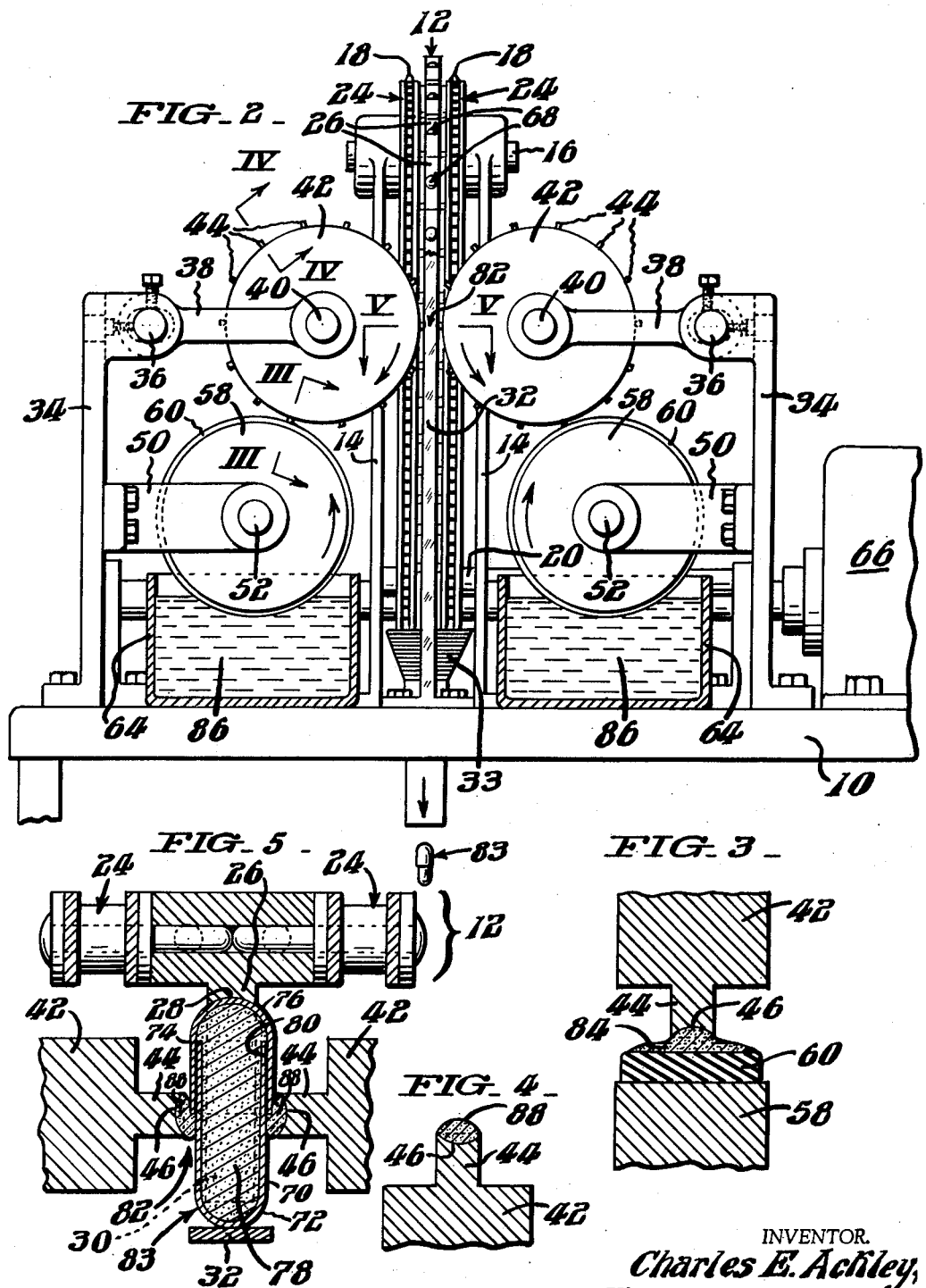

United States Patent Office 3,200,556
Patented Aug. 17, 1965

3,200,556
CAPSULE SEALING METHOD AND APPARATUS
Charles E. Ackley, Oreland, Pa., assignor to R. W. Hartnett Company, Philadelphia, Pa., a corporation of Pennsylvania
Filed Oct. 12, 1962, Ser. No. 230,208
6 Claims. (Cl. 53—38)

This invention relates generally to an article conveying and handling apparatus, more particularly to an apparatus for sealing capsules by introducing a liquid sealing agent or sealant at the seal line between the inner body and the outer cap and causing the liquid agent to be dispersed by capillarity between the two so that they seal to each other, and, more particularly, to such apparatus capable of successively sealing a continuous series of capsules as they are conveyed at a high rate of speed past a sealing station.

Many phamaceutical products are dispensed in gelatine capsules which consist of an inner end and an outer end, telescoped together. Medicinal material is placed in the inner body, and the outer cap telescopes over the filled inner body.

Capsules which are so filled at times fall apart in shipment because the two parts do not fit tightly together. Efforts have been made to seal the two parts together by placing a band of gelatin around the juncture, but such methods usually require a comparatively complex chucking procedure. Efforts have also been made to seal the two parts together by dipping the entire capsule in a liquid solvent. While this softens the two parts enough to cause them to stick together, it also softens the outer surfaces of the capsules to such an extent that they stick to each other in shipment. Such concepts also require an extra step, and each additional step in processing adds to labor costs. Further efforts have been made to seal the two parts together by bringing drops of liquid sealant simultaneously into contact respectively with the capsules of a batch thereof at the lines of juncture between the inner bodies and the outer caps. By capillarity the drop of liquid is drawn between the inner body and the outer cap, softens each of them and causes them to adhere to each other. Batch concepts are highly unsatisfactory when high production is desired.

Accordingly, an important object of the invention is to provide apparatus capable of sealing two-part capsules by the spot application of drops or globules of a liquid sealant at the line of juncture or sealing line between the inner body and the outer cap as the capsules move in a continuous succession past a sealing station at a high rate of speed.

Another object is to provide such apparatus capable of spot application of globules of liquid sealant to exposed opposite lateral sides of the capsules without the globule-applying elements themselves engaging the capsules.

Other objects of the invention will become apparent when the following specification is read with reference to the accompanying drawings, in which:

FIG. 1 is a fragmentary side elevation of apparatus embodying the invention;

FIG. 2 is a fragmentary end elevation of the apparatus shown in FIG. 1;

FIGS. 3, 4 and 5 are enlarged sections respectively on lines III—III, IV—IV and V—V of FIG. 2;

FIG. 6 is a fragmentary perspective view of the liquid sealant-applying wheel;

FIG. 7 is a perspective view of a capsule, filled but not sealed; and

FIG. 8 is a perspective view of a capsule filled and sealed.

Referring particularly to FIGS. 1 and 2, apparatus constructed in accordance with a specific form of the invention comprises a horizontally extending base plate 10 upon which is mounted an endless conveyor 12 including an upright support frame 14. At the top of the frame 14 is journaled a shaft 16 which carries a pair of axially spaced chain sprockets 18, and at the base of the frame 14 is journaled a shaft 20 which carries a pair of axially spaced chain sprockets 22, only one of which is shown. Trained over the sprockets 18 and 22 are a pair of laterally spaced chain belts 24 between which are mounted a series of carrier elements 26 each of which is recessed to provide a seat 28 and opposed shoulders 30 for receiving a capsule. The run of the chain belts extending between the sprockets 18 and 22 is vertical, and extending upwardly from the base 10 and part way around the carrier elements 26 traveling about the sprockets 18 is a guide 32 disposed in close spaced relation to the carrier elements 26. Carried by the base 10 and extending therethrough is a discharge chute 33 directly under the vertical run aforesaid of the chain belts.

On each side of the conveyor 12, affixed to the base 10 and extending upwardly therefrom, are a pair of laterally spaced brackets 34. Extending through the upper end portions of the brackets 34 are coaxially aligned pins 36 to which are connected corresponding end portions of a pair of horizontally extending arms 38. Journaled in the free end portions of the arms 38 is a shaft 40 which mounts a liquid sealant-applying wheel 42 equipped with circumferentially equally spaced liquid sealant applicator elements 44, the outer extremities of which are provided with concavities, designated 46. Also mounted upon the shaft 40 is a spur gear 48. Extending from the standards 34 are brackets 50 which have journaled in the free end portions thereof respectively sections of a shaft 52 coupled together as at 56. Mounted upon the shaft 52 is a transfer wheel 58 provided with a rubber rim 60 aligned with the wheel 42. Also mounted upon the shaft 52 is a spur gear 62 which meshes with the spur gear 48 on the shaft 40. Underlying the transfer wheel 60 is a container, designated 64.

Referring particularly to FIG. 2, an electric motor and change speed mechanism, generally designated 66, is mounted upon the bed plate 10 and operates through appropriate shafting and gearing to actuate the conveyor 12 and the wheels 42 and 60 in predetermined timed relation. The driving portion of the apparatus is essentially the same as that disclosed by my United States Patent No. 3,042,183, issued July 3, 1962. Reference may be had to said patent for further details of construction.

Referring particularly to FIG. 7, each of the capsules sealed by the apparatus has an inner body part 70 open at one end and closed at the other end by a semi-spherical portion 72. Telescoped over the open end of the inner body 70 is an outer cap part 74 open at one end and closed at the other end by a semi-spherical portion 76.

Referring to FIG. 8, the capsule, generally designated 68, is filled with powder or other content 78. The liquid sealant, upon being applied to the capsule, spreads by capillarity around the capsule between the telescoped portions thereof and penetrates from the sealing edge or line axially inwardly as shown at 80.

In the operation of the apparatus, the motor and change speed unit 66 drive the conveyor 12 and wheels 42 and 60 in predetermined time relation by means of suitable shafting and gearing, including shafts 40 and 52 and gears 48 and 62. Filled but unsealed capsules 68 are fed to the upper run of the conveyor 12, and the capsules nest in the carrier elements 26 with their opposite lateral sides exposed and with their longitudinal axes normal to the path of travel. As the capsules move over the sprockets 18, they pass under the guide 32, which keeps the capsules from being dislodged from the carrier elements 26 as they move vertically downwardly past a sealing station 82 between the wheels 42. As the capsules turn under the sprockets 22, they move away from the guide 32 and are dislodged from the carrier elements 26 by gravity, whereupon they are discharged from the conveyor 12 into the chute 33, as sealed capsules 83.

In the meantime, liquid sealant, designated 84, FIG. 3, is picked up by the rims 60 of the transfer wheels 58 from the supply thereof, designated 86, in the container 64. As wheels 42 turn, the tips of the elements 44 sweep by underlying wheels 58 in close spaced relation to the peripheral surfaces of the rims 60, in consequence of which a drop or globule 88 of the sealant is transferred to each element 44, as seen in FIG. 4. Periodically, a pair of the elements 44 respectively of the wheels 42 and one of the capsules arrive at the station 82 at the same time and move in the same direction past the station. The elements 44 move in close spaced relation respectively to the exposed opposite lateral sides of the capsules 68 and do not touch any part of capsules 68. Thus the capsules cannot be deformed by the elements 44. In this connection, the arms 38 are angularly adjustable about the pins 36 to assure proper center-to-center spacing of wheels 42 and 58, and axially shiftable to assure proper spacing of the wheels 42 from the vertical median plane of the conveyor. The globules 88 of the sealant, however, extend radially outwardly beyond the ends of elements 44, and spot engage the capsule at the sealing line and the sealant penetrates and spreads between the telescoped portions of the capsules by capillary action, as shown in FIG. 8. The sealed capsules 83 are carried downwardly by the conveyor and as they are about to enter the lower horizontal run of the conveyor, they drop from the conveyor into the chute 33 for discharge from the apparatus.

The liquid sealant may be a suitable solvent which to some extent dissolves and tackifies the surfaces of the capsule walls with which it comes into contact, or it may be a suitable liquid adhesive. By touching the sealant to the edge of the outer cap adjacent the inner body, the sealant flows by capillarity very rapidly into the area of contact between the two capsule parts, thus forming a seal. Preferably essentially all of the sealant enters between the contacting areas of the capsule parts and any incidental portion deposited externally dries by the time the capsule is discharged from the apparatus and into a collecting hopper (not shown) through the chute 33. Thus the capsules collected in the hopper do not stick together.

The sealant, whether solvent or adhesive, may be prepared as an invisible composition.

As an example, as indicated in the copending application of John R. Kane, Serial No. 230,269, now Patent No. 3,159,546, for capsules made of pure food gelatin combined with glycerin, excellent results have been obtained with a solvent which by weight is composed of 2¼ parts ethyl acetate, 1 part distilled water, ¼ part propylene glycol U.S.P., 1 part acetone and ¼ part isopropyl alcohol. Such a solvent has the low surface tension required for penetration between the overlapping areas of the two capsule parts almost instantly; it dries rapidly; and it has the required consistency for the purpose intended.

It has been found that capsules may be sealed with the apparatus and method of the invention at a rate in the order of 60,000 to 75,000 capsules per hour and above.

It will be understood, of course, that the present invention, as described and shown, is susceptible to various changes and modifications which may be made without any departure from the general principles or real spirit of the invention. Accordingly, it is intended to claim the present invention broadly, as well as specifically, as indicated in the appended claims.

What is claimed is:

1. In apparatus for sealing capsules which are essentially of the same size and shape and of the type having parts telescoped one over the other, an endless conveyor including means for receiving and retaining individual capsules disposed in a common plane and normal to the path of said conveyor and with opposite lateral sides of said capsules exposed, said conveyor being operable for moving said capsules at a predetermined rate past a sealing station, and means at said station for sealing said capsules including a pair of wheels disposed respectively on opposite sides of said conveyor, radially outwardly projecting elements disposed in a common plane normal to the first-mentioned plane and carried by each of said wheels, the latter being movable for carrying said elements past said station each in spaced relation to said capsules, means for applying globules of a sealing agent respectively to concavities formed in the tips of said elements, means for continuously actuating said wheels thereby to move said elements past and deliver said sealing agent globules to said station at said predetermined rate and to simultaneously apply said sealing agent globules respectively to said exposed sides and at the sealing lines of the capsules for sealing the same as said capsules and sealing agent globules pass by said station in the same direction.

2. In apparatus for sealing capsules which are essentially of the same size and shape and of the type having parts telescoped one over the other, an endless conveyor including means for receiving and retaining individual capsules disposed normal to the path of said conveyor and with opposite lateral sides of said capsules exposed, said conveyor being operable for moving said capsules downwardly in a straight line at a predetermined rate past a sealing station, and means at said station for sealing said capsules including a pair of wheels disposed respectively on opposite sides of said conveyor and mounted for rotation about horizontal axes, radially outwardly projecting circumferentially equally spaced elements carried by each of said wheels and disposed in a plane normal to the axes of said wheels, the latter being movable for carrying said elements past said station each in spaced relation to said capsules, means for transferring globules of a sealing agent from a source thereof respectively to concavities formed in the tips of said elements, means for continuously actuating said wheels thereby to move said elements past and deliver said sealing agent globules to said station at said predetermined rate and to simultaneously apply said sealing agent globules respectively to said exposed sides and at the sealing lines of the capsules for sealing the same as said capsules and sealing agent globules pass downwardly by said station.

3. In a process for sealing gelatin capsules having inner body and outer cap parts each with one closed end and one open end, the open ends of said outer cap parts being telescoped over the open ends of said inner body parts, the steps comprising moving a series of capsules in a continuous stream thereof at a predetermined rate of speed successively past a sealing station, moving a plurality of series of globules of sealant each in a continuous stream at said predetermined rate of speed successively past said station, and spotting each capsule at circumferentially spaced points on the edge of the outer cap part adjacent the inner body part, as the capsule passes said station, with one globule from each series thereof.

4. In a process for sealing gelatin capsules having inner body and outer cap parts each with one closed end and one open end, the open ends of said outer cap parts being telescoped over the open ends of said inner body parts, the steps comprising moving a series of capsules in a continuous stream thereof at a predetermined rate of speed successively past a sealing station, moving two series of globules of sealant each in a continuous stream at said predetermined rate of speed successively past said station, and spotting each capsule on diametrically opposite sides thereof at the edge of the outer cap part adjacent the inner body part, as the capsule passes said station, with one globule from each series thereof.

5. In a process for sealing gelatin capsules having inner body and outer cap parts each with one closed end and one open end, the open ends of said outer cap parts being telescoped over the open ends of said inner body parts, the steps comprising moving a series of capsules in a continuous stream thereof at a predetermined rate of speed successively past a sealing station, moving two endless streams of elements in circular paths on opposite sides of said station at said predetermined rate of speed successively past said station in close spaced relation of said capsules, applying to said elements globules of sealant for transfer to said capsules, said sealant being by weight composed of 2¼ parts ethyl acetate, 1 part distilled water, ¼ part propylene glycol U.S.P., 1 part acetone and ¼ part isopropyl alcohol, and applying one of said globules of sealant from each stream of said elements to the edge of the outer cap part adjacent the inner body part of each capsule, on diametically opposite sides thereof, as the capsule passes said station.

6. In apparatus for sealing capsules which are essentially of the same size and shape and of the type having parts telescoped one over the other, a conveyor including a plurality of capsule holders for receiving and retaining individual capsules, said holders being spaced apart from one another along said conveyor in a predetermined, fixed spaced relationship, and being constructed and arranged to hold said capsules at an angle to the path of conveyor movement, and with the junctures of the telescoped parts of said capsules exposed, means for controlling the speed of said conveyor for moving said capsules at a predetermined rate past a sealing station, and means at said station for sealing said capsules including a movable member disposed alongside said conveyor, spaced applicator elements spaced on said movable member in accordance with said predetermined spacing of said holders, and drive means constructed and controlled to drive said applicator elements at essentially the same linear speed as the holders on said conveyor, for carrying said applicators past said station each in spaced relation to said capsules and at the same speed therewith, said applicators being constructed for applying globules of a sealing agent respectively to the junctures of the telescoped parts of said capsules, and being of such restricted length that they are spaced slightly away from said capsules and said holders when they pass said station.

References Cited by the Examiner

UNITED STATES PATENTS

| | | | |
|---|---|---|---|
| 921,386 | 5/09 | Estes | 118—212 |
| 2,691,474 | 12/54 | Olson | 53—373 X |
| 2,931,292 | 4/60 | Ackley | 101—37 |
| 2,936,493 | 5/60 | Scherer | 53—281 X |
| 3,025,652 | 3/62 | Sandhage et al. | 53—38 X |
| 3,071,513 | 1/63 | De Boer | 53—37 X |

FRANK E. BAILEY, *Primary Examiner.*

TRAVIS S. McGEHEE, *Examiner.*